US012590643B2

(12) United States Patent
    Ganzel

(10) Patent No.:    US 12,590,643 B2
(45) Date of Patent:        Mar. 31, 2026

(54) POWERED ONE-WAY SOLENOID VALVE AND BRAKE SYSTEM USING SAME

(71) Applicant: ZF Active Safety US Inc., Livonia, MI (US)

(72) Inventor: Blaise Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 128 days.

(21) Appl. No.: 18/421,463

(22) Filed: Jan. 24, 2024

(65) Prior Publication Data

US 2025/0237318 A1      Jul. 24, 2025

(51) Int. Cl.
| | |
|---|---|
| *B60T 13/66* | (2006.01) |
| *B60T 8/34* | (2006.01) |
| *B60T 13/68* | (2006.01) |
| *B60T 15/02* | (2006.01) |
| *F16K 1/46* | (2006.01) |
| *F16K 31/06* | (2006.01) |

(52) U.S. Cl.
CPC .......... *F16K 31/0655* (2013.01); *B60T 8/341* (2013.01); *B60T 13/662* (2013.01); *B60T 13/686* (2013.01); *B60T 15/028* (2013.01); *F16K 1/46* (2013.01)

(58) Field of Classification Search
CPC .... F16K 31/0627; F16K 31/0655; F16K 1/46; B60T 13/662; B60T 13/686
See application file for complete search history.

(56) References Cited

U.S. PATENT DOCUMENTS

| | | | | |
|---|---|---|---|---|
| 2015/0129787 A1* | 5/2015 | Buettner | .................. | F16K 1/46 |
| | | | | 251/326 |
| 2022/0154843 A1* | 5/2022 | Willers | .............. | F16K 31/0675 |

FOREIGN PATENT DOCUMENTS

| | | | | | |
|---|---|---|---|---|---|
| CN | 117028647 A | * | 11/2023 | ......... | F16K 31/0655 |
| DE | 102007037220 A1 | * | 2/2009 | ......... | F16K 31/0693 |
| WO | WO-2011097392 A2 | * | 8/2011 | ......... | F16K 27/0245 |

* cited by examiner

*Primary Examiner* — Marina A Tietjen

(74) *Attorney, Agent, or Firm* — Tarolli, Sundheim, Covell & Tummino LLP

(57) ABSTRACT

A powered one-way solenoid valve includes a valve cavity defining a one-way valve fluid path. A valve seat is located along the one-way valve fluid path. A valve poppet is configured for reciprocal motion between poppet open and closed positions. When the valve poppet is in the poppet closed position, a valve poppet shoulder selectively contacts the valve seat to substantially occlude fluid flow therepast along the one-way valve fluid path. The valve poppet shoulder includes a resilient annular seal contained within a sealing groove extending circumferentially around the valve poppet shoulder. The sealing groove is cooperatively defined at least partially longitudinally between a distal valve poppet flange of the valve poppet body and an annular poppet collar. The annular poppet collar is a separate piece from the valve poppet body and is maintained proximal to the distal valve poppet flange by a collar flange.

19 Claims, 5 Drawing Sheets

POWERED ONE-WAY SOLENOID VALVE AND BRAKE SYSTEM USING SAME

RELATED APPLICATIONS

This application is related to the technologies disclosed in one or more of U.S. Provisional Patent Application No. 63/580,042, filed 1 Sep. 2023 and titled "Brake Systems with Motor-Driven Master Cylinders and Low Pressure Accumulators"; U.S. Provisional Patent Application No. 63/580,048, filed 1 Sep. 2023 and titled "Brake Systems with Motor-Driven Master Cylinders and Pump Inlet Attenuators"; U.S. patent application Ser. No. 18/474,714, filed 26 Sep. 2023 and titled "Brake Systems with Motor-Driven Master Cylinders and Pump Inlet Attenuators"; U.S. patent application Ser. No. 18/474,657, filed 26 Sep. 2023 and titled "Brake Systems with Motor-Driven Master Cylinders and Bypass Valves" (hereafter referenced as "the '657 application"); U.S. patent application Ser. No. 18/474,678, filed 26 Sep. 2023 and titled "Brake Systems with Motor-Driven Master Cylinders and Low Pressure Accumulators"; and U.S. patent application Ser. No. 18/544,551, filed 19 Dec. 2023 and titled "Accumulator with Fast Fill Supply Valve and Brake System Using Same" (hereafter referenced as "the '551 application") the entire contents of all of which are incorporated herein by reference for all purposes.

TECHNICAL FIELD

This disclosure relates to an apparatus and method for use of a powered one-way solenoid valve, and, more particularly, to methods and apparatuses of medium pressure accumulators having associated powered one-way solenoid valves and brake systems using same.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

It may be desirable to provide pressurized hydraulic fluid to a brake on an expedited basis, for some use environments (e.g., a "spike apply", when the user "slams on" the brakes). Therefore, storage of pressurized hydraulic fluid in closer proximity to the brakes than the source(s) of the pressurized hydraulic fluid may be helpful in facilitating quick braking response, in some use environments.

For example, some brake systems include a "running clearance" distance between the brake pads and rotors, to avoid unwanted drag and wear on the brakes when they are not in use. Particularly in a "spike apply" situation, a user may wish to quickly take up that running clearance distance, to avoid a delay (or the perception thereof by a driver) in brake actuation. Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", and in U.S. Patent Application Publication No. 2023/0048447, published 16 Feb. 2023 by Blaise Ganzel and titled "Apparatus and Method for Control of a Hydraulic Brake System Including Manual Pushthrough", all of which are incorporated herein by reference in their entirety for all purposes.

SUMMARY

In an aspect, alone or in combination with any other aspect, a powered one-way solenoid valve is described. A valve cavity places an input port and an output port in selective fluid communication via a one-way valve fluid path. A valve seat is located along the one-way valve fluid path and is at least partially defined by an interior wall of the valve cavity. A valve poppet is configured for reciprocal motion between a poppet open position and a poppet closed position wherein, when the valve poppet is in the poppet closed position, a valve poppet shoulder selectively contacts the valve seat to substantially occlude fluid flow therepast along the one-way valve fluid path. The valve poppet has a valve poppet body. The valve poppet shoulder includes a resilient annular seal contained within a sealing groove extending circumferentially around the valve poppet shoulder. The sealing groove is cooperatively defined at least partially longitudinally between a distal valve poppet flange of the valve poppet body and an annular poppet collar. The annular poppet collar is a separate piece from the valve poppet body and is maintained proximal to the distal valve poppet flange by a collar flange defined by a portion of the valve poppet body spaced apart from the valve poppet shoulder.

BRIEF DESCRIPTION OF THE DRAWINGS

For a better understanding, reference may be made to the accompanying drawings, which are not drawn to scale, and in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
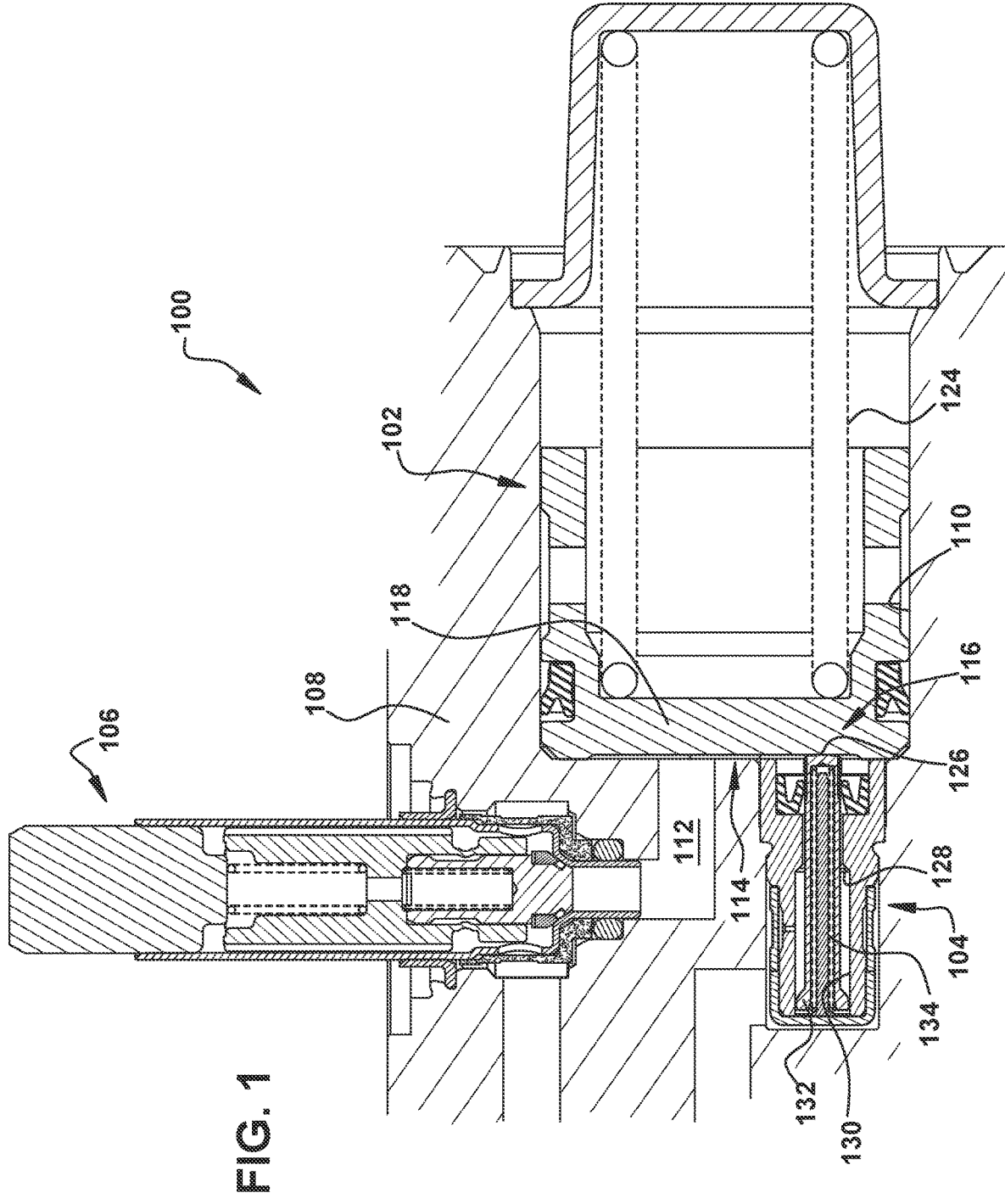
FIG. 1 is a schematic cross-sectional view of a portion of a brake system, according to an aspect of the present invention.

FIG. 1 schematically depicts an accumulator assembly 100, comprising a medium pressure accumulator 102, a nonpowered MPA fill valve 104, and a powered MPA one-way valve 106. The term "medium pressure" is used to indicate that the accumulator 102 is configured to hold, for example, an operating pressure of between about 3.9 and about 5.5 bar, in some use environments. This pressure capacity can be adjusted as desired by one of ordinary skill in the art by changing a size, shape, available spring force, configuration, and/or another property of at least one component of the medium pressure accumulator 102. The accumulator assembly 100 may be used, for example, in conjunction with a brake system, as will be discussed below in more detail. As a result of this "medium pressure" capability, the accumulator assembly 100 may have capacity for usefully storing (temporarily or permanently) and providing pressurized hydraulic fluid to other components of the brake system at a location that would not be practical for positioning of a lower-pressure accumulator (not shown). The accumulator assembly 100 can be housed in a block housing 108, shown schematically in the Figures, which may define components of the accumulator assembly 100; assist with assembling and maintaining components of the accumulator assembly 100 into an assembled device; and/or provide other housing, assembly, and/or maintenance functions as desired to any other components of the brake system.

The medium accumulator 102 includes an MPA cavity 110 including at least one brake-side passage 112 at and/or adjacent a first end 114 of the MPA cavity 110 and at least one pump-side passage 116 also at and/or adjacent the first end 114 of the MPA cavity 110. The MPA cavity 110 may be vented to atmosphere at a location spaced apart from the first end 114, as desired. An MPA piston 118 is configured for reciprocal motion within the MPA cavity 110 responsive to a predetermined amount of hydraulic fluid flow through at least one of the pump-side passage 116 and the brake-side passage 112. An MPA biasing spring 124 is provided for urging the MPA piston 118 toward the first end 114 of the MPA cavity 110.

The nonpowered MPA fill valve 104 is interposed fluidically between the pump-side passage 116 of the MPA cavity 110 and a source of pressurized hydraulic fluid, which may be at least one of a pump piston of a secondary brake module and a master cylinder, as will be discussed with reference to the brake system of FIG. 7. The MPA fill valve 104 includes an MPA fill valve cavity 126 placing the pump-side passage 116 of the MPA cavity 110 and the source of pressurized hydraulic fluid in selective fluid communication via an MPA fill valve fluid path. An MPA fill valve seat 128 is located along the MPA fill valve fluid path and is at least partially defined by an interior wall 130 of the MPA fill valve cavity 126. An MPA fill valve poppet 132 is configured for reciprocal motion at least between a poppet rest position and a poppet closed position. An MPA fill valve biasing spring 134 urges the MPA fill valve poppet 132 toward the poppet closed position. The MPA fill valve poppet 132 selectively reciprocates responsive to at least one of biasing force from the MPA valve biasing spring 134 and a fluid pressure differential between the source of pressurized hydraulic fluid and the MPA cavity 110.

Further details of the accumulator assembly 100, including specifics of operation and/or construction of the medium pressure accumulator 102 and the MPA fill valve 104, can be found in the '551 application, previously incorporated by reference, and will be omitted herein, for brevity. In general, though, it should be understood for the sake of description that the accumulator assembly 100 includes a nonpowered MPA fill valve 104 interposed fluidically between the pump-side passage 116 of the MPA cavity 110 and a source of pressurized hydraulic fluid, and a powered MPA one-way valve 106 interposed fluidically between the brake-side passage 112 of the MPA cavity 110 and at least one corresponding wheel brake, The input port 138 of the one-way valve 106 is configured to accept hydraulic fluid from the brake-side passage 112 of the MPA cavity 110 and the output port 140 of the one-way valve 106 is configured to supply hydraulic fluid to the at least one corresponding wheel brake, with structure and operation of the one-way valve 106 being further described below.

FIGS. 2-6 schematically depict the structures and operation of a powered one-way solenoid valve 106 which is suitable for use as the aforementioned powered MPA one-way valve interposed fluidically between the brake-side passage 112 of the MPA cavity 110 and at least one corresponding wheel brake.

Figure 2:
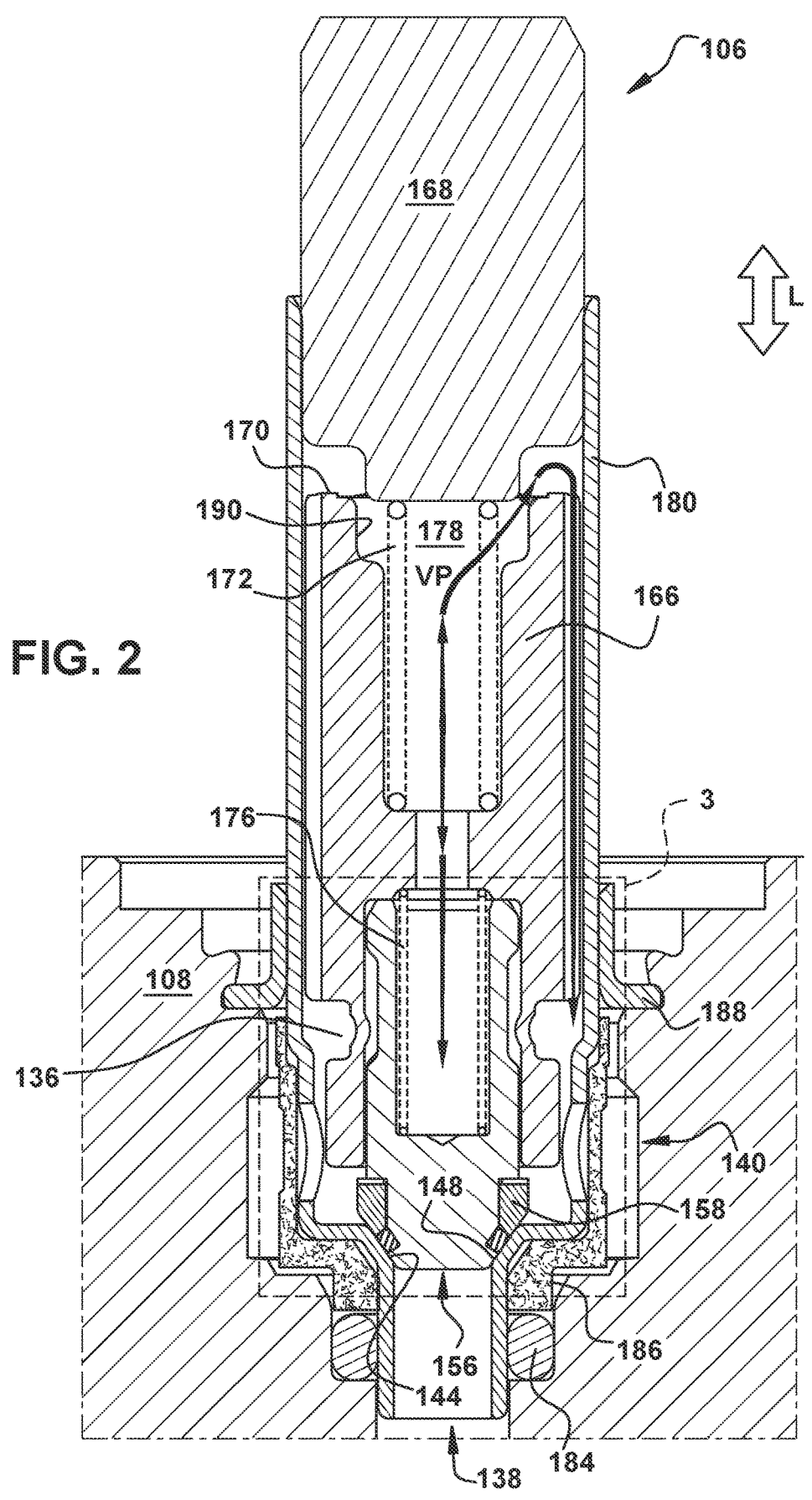
FIG. 2 is a schematic cross-sectional view of a component of the portion of the brake system of FIG. 1, in a first condition.
Figure 3:
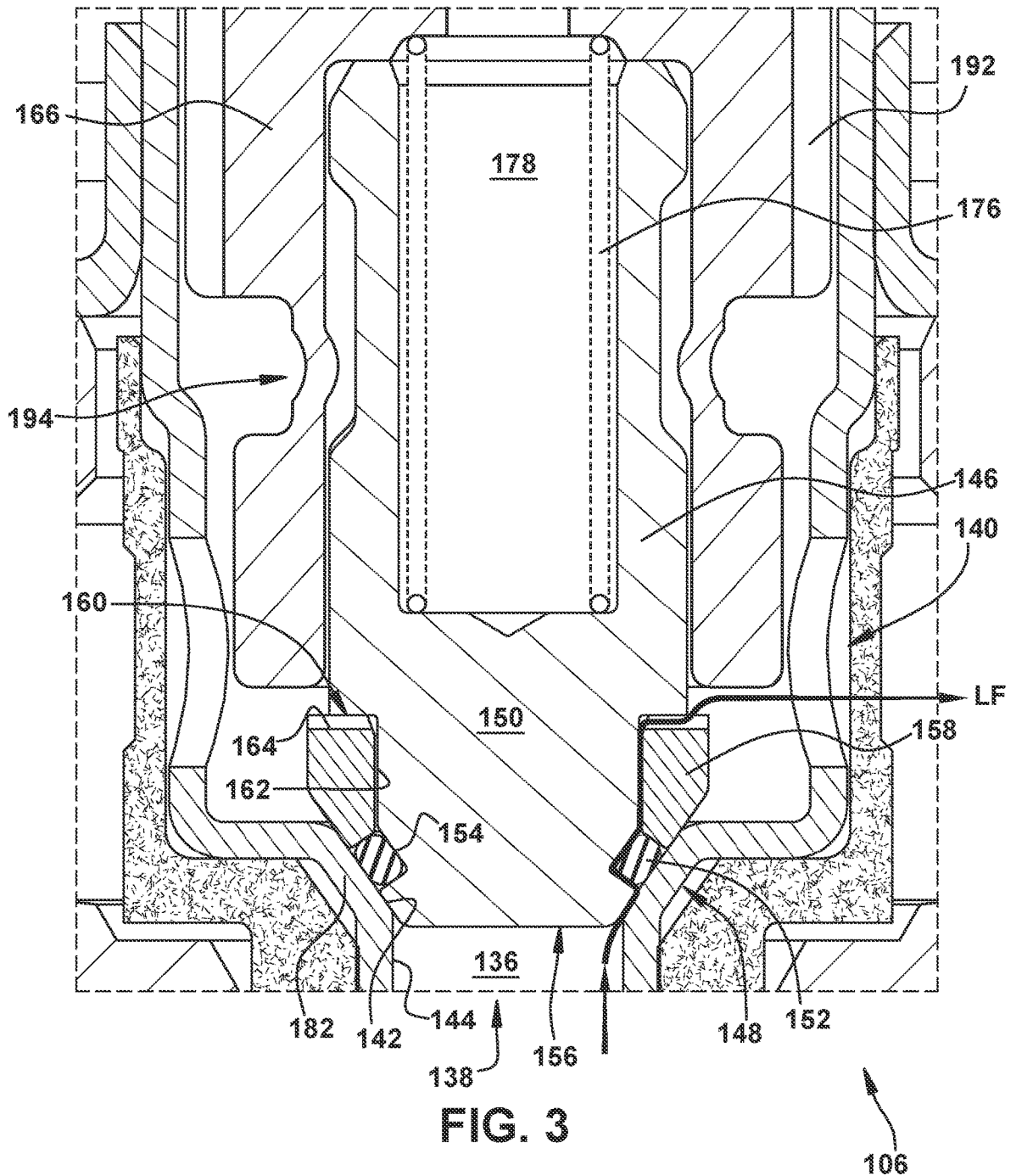
FIG. 3 is a schematic detail view of area "3" of FIG. 2.
Figures 4, 5, 6:
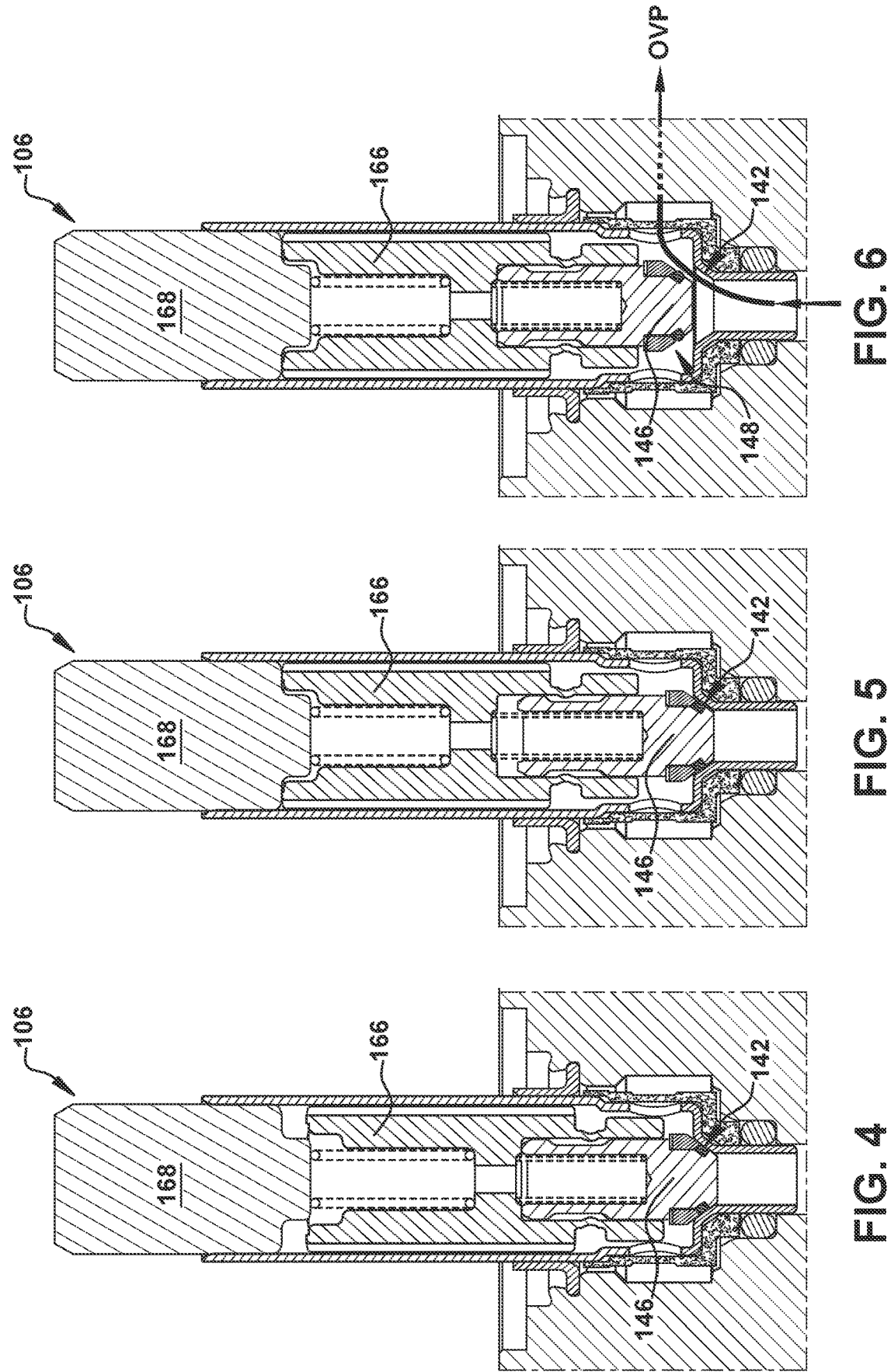
FIG. 4 is a schematic cross-sectional view of the component of FIG. 2, in the first condition.
FIG. 5 is a schematic cross-sectional view of the component of FIG. 2, in a second condition.
FIG. 6 is a schematic cross-sectional view of the component of FIG. 2, in a third condition.

With particular reference to FIGS. 2-3, the MPA one-way valve (one-way solenoid valve 106) includes a valve cavity 136 placing an input port 138 and an output port 140 in selective fluid communication via a one-way valve fluid path OVP (shown schematically in FIG. 6). A valve seat 142 is located along the valve fluid path OVP and is at least partially defined by an interior wall 144 of the valve cavity 136.

A valve poppet 146 is configured for reciprocal motion between a poppet open position and a poppet closed position. When the valve poppet 146 is in the poppet closed position, a valve poppet shoulder 150 selectively contacts the valve seat 142 to occlude fluid flow therepast along the valve fluid path OVP. The valve poppet 146 has a valve poppet body 150. Reciprocal motion of the valve poppet 146 occurs at least partially responsive to a predetermined amount of fluid pressure differential between the input port 138 and the output port 140, as will be described below.

The valve poppet shoulder 148 includes a resilient annular seal 152 contained within a sealing groove 154 extending circumferentially around the valve poppet shoulder 148, as is shown in detail in FIG. 3. The annular seal 152 should be of a sufficiently resilient construction (e.g., an elastomeric or polymer o-ring) to press firmly against the valve seat 142 and thus substantially prevent unwanted fluid flow therepast when the one-way valve 106 is in a closed configuration.

The sealing groove 154 is cooperatively defined at least partially longitudinally between a distal valve poppet flange 156 of the valve poppet body 150 and an annular poppet collar 158. The "longitudinal" direction, as the term is used relative to the one-way valve 106, is substantially parallel to arrow "L" of FIG. 2, or in the vertical direction, in the orientation of FIGS. 2-6. The "proximal" direction is longitudinally upward (in the orientation of FIGS. 2-6) in relation to the "distal" direction.

The annular poppet collar 158 is a separate piece from the valve poppet body 150 and is maintained proximal to the distal valve poppet flange 156 by a collar flange 160 defined by a portion of the valve poppet body 150 spaced apart from the valve poppet shoulder 148. As shown in at least FIG. 2, the collar flange 160 may include a laterally extending face adjacent to the annular poppet collar 158 which serves to prevent longitudinal motion of the annular poppet collar 158 away from the valve seat 142 under pressure. The "lateral" direction, as referenced with respect to FIGS. 2-6, is substantially perpendicular to the longitudinal direction L.

The valve poppet body 150 may be comprised substantially of a first material and the annular poppet collar 158 may be comprised substantially of a second material, different from the first material. For example, in some use environments, the first material may be a metal (for hardness and/or durability), and the second material may be a polymer (for ease of assembly, flexibility, cost, and/or weight reasons).

The one-way valve 106 may include a leak fluid path (shown schematically at LF of FIG. 3) at least partially defined cooperatively by the sealing groove 154, an inner surface 162 of the annular poppet collar 158 disposed laterally adjacent the valve poppet body 150, and a proximal surface 164 of the annular poppet collar 158 disposed longitudinally adjacent the collar flange 160. When present, the leak fluid path LF may permit a predetermined amount of hydraulic fluid flow therepast between the input port 138 and the output port 140 of the one-way valve 106 responsive to a fluid pressure differential therebetween. At least a portion of the leak fluid path LF, when present, is separate from the one-way valve fluid path OVP. The leak fluid path LF may help to avoid unwanted extrusion of the annular seal 152 from the sealing groove 154 due to pressure-assisted opening of the one-way valve 106, discussed below with respect to FIGS. 4-6.

The one-way solenoid valve 106 includes an armature 166 for selective longitudinally reciprocating motion with respect to the valve cavity 136 between first and second armature positions (shown in FIGS. 4, and 5-6, respectively).

The one-way solenoid valve 106 includes a core 168 for selectively magnetically attracting the armature 166. The core 168 is located longitudinally directly adjacent a core-activated surface 170 of the armature 166. The armature 166 is longitudinally interposed between the core 168 and the valve poppet 146. The core 168 is selectively energized to magnetically drive the armature 166 between the first armature position of FIG. 4 and the second armature position of FIGS. 5-6. A core spring 172 biases the armature 166 toward the valve poppet 146—i.e., toward the first armature position—to make the valve 106 a normally-closed type of valve, which is then electrically (solenoid) actuated to selectively open. The core spring 172 is at least partially contained within a longitudinal core spring bore 174 of the armature 166 and exerts an expansion force between the armature 166 and the core 168—i.e., biases the core 168 and armature 166 mutually apart.

The valve poppet 146 is held into engagement with the valve seat 142, in the poppet closed position, responsive to the armature 166 being in the first armature position. As a result, the valve fluid path OVP is occluded when the armature 166 is in the first armature position, and pressurized hydraulic fluid is not permitted to travel from the input port 138 toward the output port 140. The valve poppet 146 is permitted to selectively reciprocate between the poppet closed position of FIG. 5 and the poppet open position of FIG. 6 responsive to the armature 166 being in the second armature position. As a result, the valve fluid path OVP may be occluded when the armature 166 is in the second armature position, or may not be occluded at that time, depending upon the position of the valve poppet 146.

A poppet spring 176 biases the valve poppet 146 toward the poppet closed position and thus biases the valve poppet shoulder 140 toward sealing engagement with the valve seat 142 when the armature 166 is in the second armature position. The poppet spring 176 is at least partially contained within a longitudinal poppet spring bore 178 of the poppet 146 and exerts an expansion force between the poppet 146 and the armature 166—i.e., biases the poppet 146 and the armature 166 mutually apart. Again, this is the arrangement shown in FIG. 5. Conversely, reciprocal motion of the valve poppet 146 from the poppet closed position of FIG. 5 toward the poppet open position of FIG. 6 is permitted to occur at least partially responsive to a fluid pressure at the input port 138 being greater than a predetermined fluid pressure at the output port 140. When the valve poppet 146 is urged toward the poppet open position of FIG. 6 by fluid pressure from the input port 138, the valve fluid path OVP is permitted to open, and pressurized hydraulic fluid flows through the valve 106, along the valve fluid path OVP, toward the brake to facilitate a "spike apply", or otherwise to provide pressurized hydraulic fluid to the wheel brake in a desired manner for operation of the brake system.

The one-way solenoid valve 106 may be configured and constructed in any desired manner, and may readily be provided by one of ordinary skill in the art for a desired use environment. By way of example, given the medium pressures previously mentioned, the valve fluid path OVP might be configured to take about 7.7 bars of force from the input port 138 direction (to overcome spring force of at least one of the core and poppet springs 172 and 176) to open when the valve 106 is in the FIG. 4 configuration, about 110 mbars (to overcome the force of the poppet spring 176 and shift the valve poppet 146 initially) to start opening in the FIG. 5 configuration, and about 240 mbars (to move the valve poppet 146 fully away from the valve seat 142) to fully open into the FIG. 6 configuration.

The example one-way valve 106 configuration shown in the Figures includes a core sleeve 180 received at least partially in a housing 108. (The housing 108 also at least partially defining the MPA cavity 110 when the one-way valve 106 is serving as a portion of an accumulator assembly 100.) The core sleeve 180, when present, is configured to maintain the core 168 in spaced relationship with the armature 166. The armature 166 is at least partially enclosed within the core sleeve 180 is and guided thereby for selective longitudinal reciprocating motion with respect to the core 168, responsive to energization of the core 168. Optionally, and also as shown in the Figures, the core sleeve 180 may completely enclose the valve poppet 146.

The core sleeve 180 is shown as having a reduced-diameter sleeve shoulder 182, located on an opposite end of the valve poppet 146 from the core 168. The sleeve shoulder 182 at least partially defines the valve seat 142 by comprising at least a portion of an interior wall 144 of the valve cavity 136, at that location on the valve 106. Any desired number, configuration, and type of resilient seals 184, to prevent fluid leakage; retainers 186, to keep the components of the valve 106 spaced or arranged as desired; and/or flanges 188, to maintain the valve 106 within the block housing 108, may be provided by one of ordinary skill in the art for a particular use environment of the accumulator assembly 100.

With reference to FIG. 3, the core spring bore 174 of the armature 166 extends completely longitudinally through the armature 166 and has a stepped inner bore surface 190. This stepped inner bore surface 190 may be helpful in providing a laterally extending surface for at least one of the core spring 172 and the poppet spring 176 to interact with and thus exert the aforementioned biasing force. The core spring bore 174 at least partially defines a vent path VP to place the core spring bore 174 in fluid communication with the poppet spring bore 178. As well, an outer surface of the armature 166 may include at least one longitudinally extending flow slot 192 placing a proximalmost end of the core spring bore 174 in fluid communication with the output port 140 and accordingly into fluid communication with the vent path VP, via the core spring bore 174. The vent path VP and flow slot(s) 192 can therefore quickly move hydraulic fluid therealong, longitudinally through and past the body of the armature 166, to allow the poppet 146 to move quickly between the poppet open and closed positions. That is, the vent path VP and flow slot(s) 192 help provide for fast shifting or relocation of hydraulic fluid within the valve cavity 136 that otherwise would resist movement of the poppet 146.

At least a portion of the armature 166 may be crimped laterally adjacent to at least a portion of the poppet 146, to help maintain the poppet 146, core spring 172, and/or poppet spring 176 in place during assembly of the one-way valve 106. This crimped area is shown schematically at 194 in FIG. 3, and may be laterally coincident with a reduced-diameter portion of the valve poppet body 150, as shown, to allow the poppet 146 to longitudinally reciprocate a predetermined total travel length.

Figure 7:
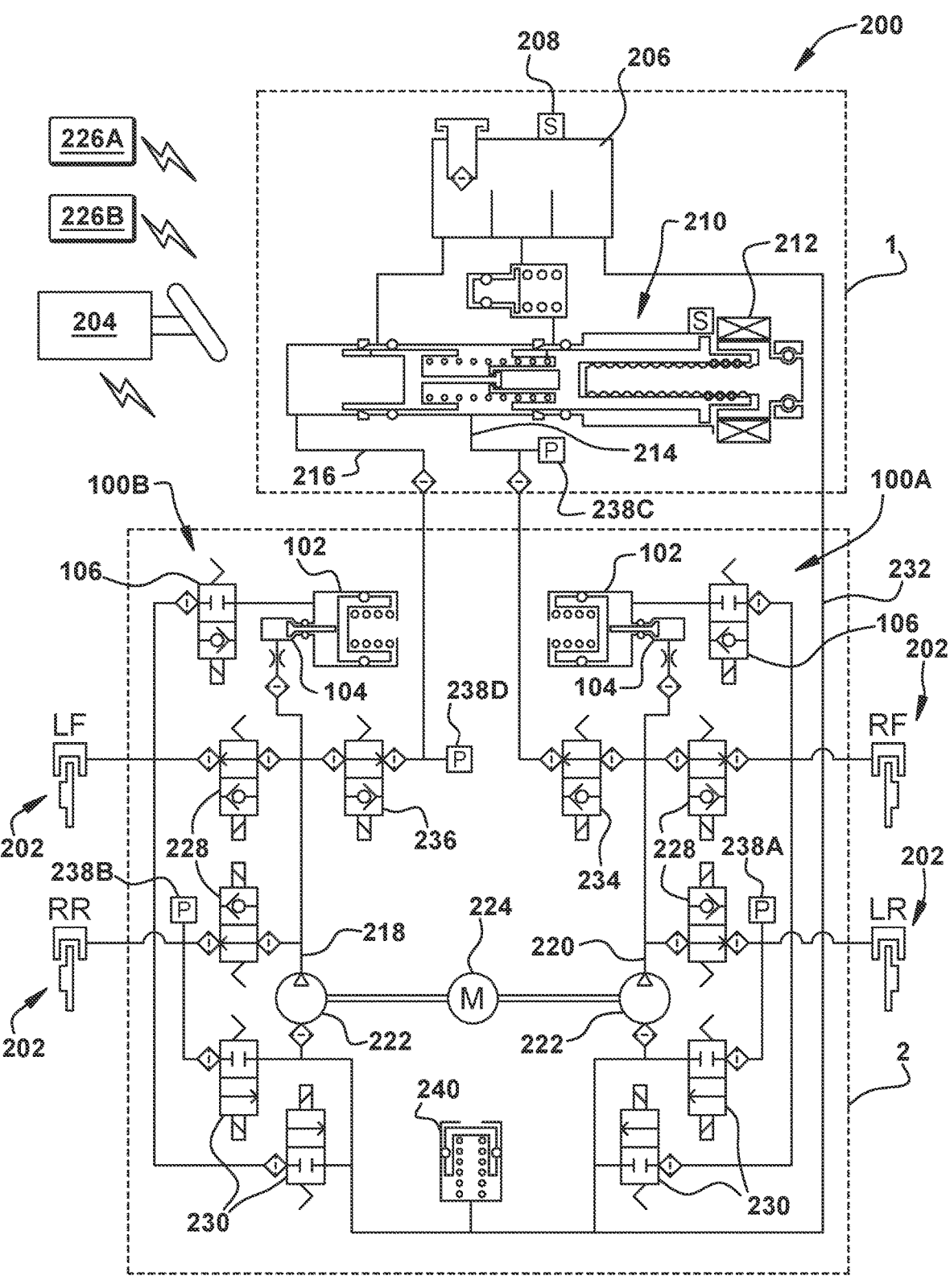
FIG. 7 is a schematic hydraulic diagram of an example brake system incorporating the components of FIGS. 1-2.

FIG. 7 schematically depicts an example brake system 200 for actuating a plurality of wheel brakes 202 comprising first and second pairs of wheel brakes 202. The brake system 200 is shown here as a hydraulic braking system, in which fluid pressure is utilized to apply braking forces for the brake system 200. The brake system 200 may suitably be used on a ground vehicle, such as an automotive vehicle having four wheels with a wheel brake associated with each wheel. Furthermore, the brake system 200 can be provided with other braking functions such as anti-lock braking (ABS) and other slip control features to effectively brake the vehicle. Components of the brake system 200 may be housed in one or more blocks or housings (e.g., housing 108). The blocks or housings may be made from solid material, such as aluminum, that has been drilled, machined, or otherwise formed to house the various components. Fluid conduits may also be formed in the block or housing.

In the illustrated embodiment of the brake system 200 of FIG. 7, there are four wheel brakes 202, which each can have any suitable wheel brake structure operated electrically and/or by the application of pressurized brake fluid. Each of the wheel brakes 202 may include, for example, a brake caliper mounted on the vehicle to engage a frictional element (such as a brake disc) that rotates with a vehicle wheel to effect braking of the associated vehicle wheel. The wheel brakes 202 can be associated with any combination of front and rear wheels of the vehicle in which the corresponding brake system 200 is installed. For example, the brake system 200 may be configured as a vertically split or diagonally split system. No differentiation is made herein among the construction of the various wheel brakes 202, for the purposes of this description, though one of ordinary skill in the art could readily provide a suitable braking arrangement for a particular use environment. The wheel brakes 202 are described herein as comprising first and second pairs of wheel brakes 202, with the first and second pairs being characterized as RF/LR and LF/RR, as shown as FIG. 7, for the sake of description. However, LF/LR and RF/RR, or RF/LF and RR/LR, pairs could also or instead be specified for the brake system 200, as desired.

Also for the sake of description, it is presumed that a deceleration signal transmitter (shown schematically at 204) is configured to provide a braking signal, in a wired or wireless manner, corresponding to a desired braking action by an operator of the vehicle. The deceleration signal transmitter 204 could include, but not be limited to, a brake pedal, an autonomous braking controller, and/or any other suitable scheme for generating a braking signal from which the brake system 200 can be actuated.

The brake system 200 also includes a fluid reservoir 206. The reservoir 206 stores and holds hydraulic fluid for the brake system 200. The fluid within the reservoir 206 is preferably held at or about atmospheric pressure, but the fluid may be stored at other pressures if desired. The reservoir 206 is shown schematically as having three tanks or sections in FIG. 7, with fluid conduit lines connected thereto. The sections can be separated by several interior walls within the reservoir 206 and are provided to prevent complete drainage of the reservoir 206 in case one of the sections is depleted due to a leakage via one of the three lines connected to the reservoir 206. Alternatively, the reservoir 206 may include multiple separate housings. The reservoir 206 may include at least one fluid level sensor 208 for detecting the fluid level of one or more of the sections of the reservoir 206.

The motor-driven master cylinder ("MC" or "[primary] power transmission unit") 210 (which may be a dual-chamber type master cylinder 210, also known as a tandem power transmission unit) of the brake system 200 functions as a source of pressure to provide a desired pressure level to the hydraulically operated wheel brakes 202 during a typical or normal non-failure brake apply. An example of a suitable MC 210 arrangement is disclosed in co-pending U.S. patent application Ser. No. 17/708,070, filed 30 Mar. 2022 and titled "Tandem Power Transmission Unit and Brake Systems Using Same", which is incorporated by reference herein in its entirety for all purposes. The master cylinder 210 is operable during a normal non-failure braking mode by actuation of an electric motor 212 of the master cylinder 210 to generate brake actuating pressure at first and second MC outputs 214 and 216, respectively, for hydraulically actuating the first and second pairs of wheel brakes 202.

After a brake apply, fluid from the wheel brakes 202 may be returned to the master cylinder 210 and/or be diverted to the reservoir 206. It is also contemplated that other configurations (not shown) of the brake system 200 could include hydraulic control of just selected one(s) of the wheel brakes (with the others being electrically controlled/actuated). One of ordinary skill in the art would be readily able to provide such an arrangement for a desired use environment, following aspects of the present invention.

A secondary brake module is configured for selectively providing pressurized hydraulic fluid at first and second pump outputs 218 and 220, respectively, for actuating the first and second pairs of wheel brakes 202 in at least one of a normal non-failure braking mode and a backup braking mode. As shown in FIG. 7, the secondary brake module includes at least one pump piston 222 associated with at least one wheel brake 202 of the plurality of wheel brakes 202. The pump piston 222 is driven by an eccentric bearing (not shown) on a shaft of an electric pump motor 224 (as differentiated from the electric motor 212 included in the master cylinder 210) which transmits rotary motion to each pump piston 222 for selectively providing pressurized hydraulic fluid to an iso/dump control valve arrangement of at least one wheel brake 202 which is associated with the pump piston 222. FIG. 7 shows one pump piston 222 as being associated with two wheel brakes 202, for a total of two pump pistons 222 in the brake system 200. Together, the pump piston(s) 222 and electric pump motor 224 can be considered to comprise a secondary brake module (A.K.A. "secondary power transmission unit") of the brake system 200. For example, the two pump pistons 222 shown in the Figures may provide pressurized hydraulic fluid at first and second pump outputs 218 and 220, respectively, to the corresponding wheel brakes 202 via the corresponding iso/dump control valve arrangements (when present), to actuate the first and second pairs of wheel brakes 202 in at least one of a normal non-failure braking mode and a backup braking mode. Each of the first and second pump outputs 218 and 220 can provide fluid to a corresponding one of the first and second pairs of wheel brakes 202. It is contemplated that a plurality of pump pistons 222 could be associated with each of the first and second pump outputs 218 and 220, in some configurations of the brake system 200.

The secondary brake module of the brake system 200 may function as a source of pressure to provide a desired pressure level to selected ones of the wheel brakes 202 in a backup or "failed" situation, when, for some reason, the master cylinder 210 is unable to provide fluid to those selected wheel brakes 202. Accordingly, the secondary brake module may be directly fluidly connected to the reservoir 206, for exchanging hydraulic fluid between these components without having to route the fluid through a (potentially failed) motor-driven master cylinder 210 or another structure of the brake system 200.

The secondary brake module can be used to selectively provide hydraulic fluid to at least one of the wheel brakes 202 in a backup braking mode, but also in an enhanced braking mode, which can occur on its own and/or concurrently with either the backup braking mode or a non-failure normal braking mode. Examples of suitable enhanced braking mode functions available to the brake system 200 may include, but not be limited to, "overboost" (in which higher pressure is provided to a particular brake than would normally be available from the master cylinder 210 alone) and "volume-add" (in which more fluid is provided to a particular brake than would normally be available from the master cylinder 210). These enhanced braking modes may be facilitated, in some use environments, by the pump piston(s) 222. For example, in at least one of the normal non-failure braking mode and the backup braking mode, the secondary brake module can then supply boosted-pressure (above what was obtained from the master cylinder 210) hydraulic fluid to at least one of the first and second pump outputs 218 and 220.

The brake system 200 shown in FIG. 7 also includes at least one electronic control unit ("ECU") 226, for controlling at least one of the master cylinder 210 and the secondary brake module (via electric pump motor 224) responsive to at least one brake pressure signal and/or at least one braking signal, with first and second ECUs 226A, 226B being shown and described herein. The ECUs 226A, 226B may include microprocessors and other electrical circuitry. The ECUs 226A, 226B receive various signals, process signals, and control the operation of various electrical components of a corresponding brake system 200 in response to the received signals, in a wired and/or wireless manner. The ECUs 226A, 226B can be connected to various sensors such as the reservoir fluid level sensor(s) 208, pressure sensors, travel sensors, switches, wheel speed sensors, and steering angle sensors. The ECUs 226A, 226B may also be connected to an external module (not shown) for receiving information related to yaw rate, lateral acceleration, longitudinal acceleration of the vehicle, or other characteristics of vehicle operation for any reason, such as, but not limited to, controlling the brake system 200 during vehicle braking, stability operation, or other modes of operation. Additionally, the ECUs 226A, 226B may be connected to the instrument cluster for collecting and supplying information related to warning indicators such as an ABS warning light, a brake fluid level warning light, and a traction control/vehicle stability control indicator light. It is contemplated that at least one of the ECUs 226A and 226B may be, for example, integrated with the master cylinder 210 or the electric pump motor 224.

The first and second ECUs 226A and 226B may divide the control tasks for the brake system 200 in any desired manner, and may be readily configured by one of ordinary skill in the art for a particular use environment of a brake system, though it is contemplated that any control tasks performed by one or more ECUs 226 will be accomplished responsive to at least one brake pressure signal and/or a braking signal produced by the deceleration signal transmitter 204. For example, the first ECU 226A may be operative to control the electric motor 212 of the master cylinder 210. The second ECU 226B may be operative to control the electric pump motor 224, and potentially, as will now be discussed, at least one of the iso/dump control valve arrangements and at least one of the first and second traction control iso valve.

An iso/dump control valve arrangement is shown in FIG. 7 as being associated with each wheel brake 202 of the plurality of wheel brakes 202. Each iso/dump control valve arrangement includes an iso valve 228 and a dump valve 230, for providing desired fluid routing to an associated wheel brake 202. The reservoir 206 is hydraulically connected to the master cylinder 210 and to each of the iso/dump control valve arrangements, such as via the return line 232. The iso/dump control valve arrangements each include respective serially arranged iso and dump valves 228 and 230. The normally open iso valve 228 for each iso/dump control valve arrangement is located hydraulically between a respective wheel brake 202 and the master cylinder 210 and the normally closed dump valve 230 for each iso/dump control valve arrangement is located hydraulically between a respective wheel brake 202 and the reservoir 206, for the corresponding wheel brake 202.

The iso/dump control valve arrangements may selectively provide slip control to at least one wheel brake 202 powered by the master cylinder 210 and/or the secondary brake module previously mentioned. More broadly, the iso/dump control valve arrangement, and/or other valves of the brake system 200, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

A first traction control iso valve 234 is hydraulically interposed between the master cylinder 210 and at least one iso/dump control valve arrangement via the first MC output 214. A second traction control iso valve 236 is hydraulically interposed between the master cylinder 210 and at least one iso/dump control valve arrangement via the second MC output 216. As shown in FIG. 7, it is contemplated that an iso/dump control valve arrangement may be associated with each wheel brake 202 of the first and second pairs of wheel brakes. The first traction control iso valve 236 is hydraulically interposed between the motor-driven master cylinder 210 and the iso/dump control valve arrangements of the first pair of wheel brakes 202. Similarly, the second traction control iso valve 238 is hydraulically interposed between the motor-driven master cylinder 210 and the iso/dump control valve arrangements of the second pair of wheel brakes 202.

As can be seen, each iso/dump control valve arrangement in the brake system 200 of FIG. 7 is in direct or indirect fluid communication with both a selected one of the first and second MC outputs 214 and 216 and a selected one of the first and second pump outputs 218 and 220 for selectively receiving pressurized fluid therefrom, such as during different braking modes or otherwise as desired. One of ordinary skill in the art will be readily able to configure a brake system 200 for any particular use application as desired.

A brake pressure signal is at least one input that an ECU 226 may consider and responsively control one or more other components of the brake system 200, to achieve desired braking results for a particular use environment. One potential source of the brake pressure signal is a brake pressure sensor. For example, and as shown in the Figures, the brake system 200 can include at least one, such as at least two, brake pressure sensors 238. As can be seen in FIG. 7, a first brake pressure sensor 238A may be interposed hydraulically between a selected iso/dump control valve arrangement and a corresponding rear brake of a chosen one of the first and second pairs of wheel brakes 202, and a second brake pressure sensor 238B may be interposed hydraulically between an other iso/dump control valve arrangement and a corresponding rear brake of an other one of the first and second pairs of wheel brakes 202. Either along with or instead of the first and second brake pressure sensors 238A, 238B, a third brake pressure sensor 238C may be interposed hydraulically between the first traction control iso valve 218 and the master cylinder 210, and/or a fourth brake pressure sensor 238D may be interposed hydraulically between the second traction control iso valve 220 and the master cylinder 210. One of ordinary skill in the art can readily provide a desired number/position/type of pressure sensors 238 for a particular brake system 200.

In the brake system 200 of FIG. 7, a single return line 232 places the reservoir 206 and each pump piston 222 in hydraulic connection. The brake system 200 also includes a pump inlet attenuator 240 interposed hydraulically between the reservoir 206 and the pump pistons 222 for "smoothing" fluid flow therebetween. The pump inlet attenuator 240 is in direct fluid connection with the reservoir 206 via the single return line 232 and regulates pressure in the single return line 232 to reduce pressure fluctuations at an inlet side of each pump piston 222 via solely mechanical pressure attenuation. At least a portion of the pump inlet attenuator 240 may be in fluid communication with an ambient space outside the brake system 200 as desired. The pump inlet attenuator 240 may be a single pump inlet attenuator 240 as shown and discussed herein, or it is contemplated that multiple pump inlet attenuators (not shown) may be provided for certain use environments of the brake system 200.

Known brake systems require the column of fluid in the return line 232 to accelerate and decelerate due to the flow ripple generated at the inlets of the pump pistons 202. This causes undesirable pressure ripple and decreased pump volumetric efficiency. Conversely, presence of the pump inlet attenuator 240 facilitates improved pump build rate performance with a smaller-diameter and/or longer return line 232. The pump inlet attenuator 240 (A.K.A., "pump inlet damper") can be packaged inline in the return line 232 (e.g., in a reservoir hose adapter of the brake system 200) or "piggybacked" in a housing body structure of another component (e.g., a secondary brake module). Since the pump pistons 222 of the brake system 200 pull relatively low-pressure fluid from the return line 232 (within which the pump inlet attenuator 240 is inline), the pump inlet attenuator 240 does not need to be able to withstand the relatively high pressures developed in conduits sourced from the master cylinder 210. Thus, the pump inlet attenuator 240 can service both/all of the pump pistons 222 concurrently, but still with relatively inexpensive (e.g., molded plastic) components since the pump inlet attenuator 240 is operating in a low-pressure environment, as shown.

Conversely, and as previously mentioned, the accumulator assembly 100 shown in FIG. 1 can be used in at least a medium-pressure environment. To that end, a first accumulator assembly 100A is interposed hydraulically between the first MC output 214 and at least one wheel brake 202 of the first pair of wheel brakes 202. A second accumulator assembly 100B is interposed hydraulically between the second MC output 216 and at least one wheel brake 202 of the second pair of wheel brakes 202. As a one-way valve 106 is contained within each of the first and second accumulator assemblies 100, it should be noted that reciprocal motion of the valve poppet 146 of each one-way valve 106 occurs at least partially responsive to a fluid pressure in the MPA cavity 110 being greater than a predetermined wheel-side fluid pressure.

For example, and as shown in FIG. 7, the first and second accumulator assemblies 100A and 100B each are configured to provide pressurized hydraulic fluid to a corresponding front wheel brake 202 more quickly than either the motor-driven master cylinder 210 or the secondary brake module would be able to get pressurized hydraulic fluid to the corresponding front wheel brake(s) 202, given the brake system 200 configuration. This may be helpful, for example, during a "spike apply" situation or other quick-response command by a user (e.g., "slamming on" the brakes when a fast stop of a vehicle is desired), particularly when there is a running clearance between a brake pad and rotor that is desired to be taken up quickly.

The first and second accumulator assemblies 100A and 100B also may each facilitate a non-powered evac/fill phase of lifetime operation of the brake system, as previously mentioned, which could be helpful in efficient and expedient assembly/manufacture of a vehicle. It is also contemplated that the first and second accumulator assemblies 100A and 100B may facilitate recharging of the medium pressure accumulators 102 without the application of pressure to the corresponding wheel brake(s), but merely the use of "pass-through" fluid directly from one or more sources of pressurized hydraulic fluid (e.g., the motor-driven master cylinder 210 and/or the secondary brake module). To that end, reciprocal motion of the MPA fill valve poppets 132 of the first and second accumulator assemblies 100A and 100B may at least partially occur responsive to at least one of an application status of at least one associated wheel brake 202, relative pressures within the MPA cavity 210 and at least one other component of the accumulator assembly 100, and the operation of at least associated one iso valve 228 of an iso/valve control valve arrangement.

Moreover, the one-way solenoid valve 106 design provides a simpler (and thus potentially less expensive) valve package than in prior art versions which need to allow two-way fluid travel to and from an accumulator.

With reference again to FIG. 7, the reservoir 206 and motor-driven master cylinder 210 may be co-located in a first housing (indicated schematically by dashed line "1" in those Figures), and the secondary brake module may be located in a second housing (indicated schematically by dashed line "2" in those Figures), spaced apart from the first housing. Optionally, and also as shown in FIG. 7, the iso/dump control valve arrangements, the first and second accumulator assemblies 100A and 100B, and/or the first and second traction control iso valves 218 and 220 may also be located in the second housing.

The first and second housings (and included/co-located components) of any brake systems 200 may be provided and configured for a particular use application by one of ordinary skill in the art based upon factors including, but not limited to, achieving desired outcomes in at least one of design, manufacturing, service, spatial utilization in the vehicle, cost, size, regulatory compliance, or the like.

It is contemplated that various other components, such as electric service and/or parking brake motors, could be provided by one of ordinary skill in the art to achieve desired configurations for particular use environments, in the brake system 200 described herein. For example, while a number of filters and pressure or other sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

It is contemplated that, while the various components are shown schematically in certain arrangements in the Figures, the components might not reach the precise relative configurations shown, depending on operating conditions in a particular use environment. For example, a poppet might not shuttle to entirely occlude an associated valve seat. However, one of ordinary skill in the art will understand which potential other positions may substantially produce a desired outcome, for a particular use environment. Various orifice sizes, fluid paths, hydraulic passageways, and other components of the accumulator assembly 100 can be configured by one of ordinary skill in the art to achieve desired operational characteristics of the accumulator assembly 100 in a particular use environment.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A powered one-way solenoid valve, comprising:
   a valve cavity placing an input port and an output port in selective fluid communication via a one-way valve fluid path;
   a valve seat located along the one-way valve fluid path and at least partially defined by an interior wall of the valve cavity; and
   a valve poppet configured for reciprocal motion between a poppet open position and a poppet closed position wherein, when the valve poppet is in the poppet closed position, a valve poppet shoulder selectively contacts the valve seat to substantially occlude fluid flow therepast along the one-way valve fluid path, the valve poppet having a valve poppet body;
   wherein the valve poppet shoulder includes a resilient annular seal contained within a sealing groove extending circumferentially around the valve poppet shoulder, the sealing groove being cooperatively defined at least partially longitudinally between a distal valve poppet flange of the valve poppet body and an annular poppet collar;
   wherein the annular poppet collar is a separate piece from the valve poppet body and is maintained proximal to the distal valve poppet flange by a collar flange defined by a portion of the valve poppet body spaced apart from the valve poppet shoulder; and
   wherein a leak fluid path is at least partially defined cooperatively by the sealing groove, an inner surface of the annular poppet collar disposed laterally adjacent the valve poppet body, and a proximal surface of the annular poppet collar disposed longitudinally adjacent the collar flange, the leak fluid path permitting a predetermined amount of hydraulic fluid flow therepast between the input port and the output port responsive to a fluid pressure differential therebetween, at least a portion of the leak fluid path being separate from the one-way valve fluid path.

2. The solenoid valve of claim 1, wherein the valve poppet body is comprised substantially of a first material and the annular poppet collar is comprised substantially of a second material, different from the first material.

3. The solenoid valve of claim 2, wherein the first material is a metal and the second material is a polymer.

4. The solenoid valve of claim 1, wherein reciprocal motion of the one-way valve poppet occurs at least partially responsive to a predetermined amount of fluid pressure differential between the input port and the output port.

5. The solenoid valve of claim 1, including an armature for selective longitudinally reciprocating motion with respect to valve cavity between first and second armature positions, wherein the valve poppet is held into engagement with the valve seat, in the poppet closed position, responsive to the armature being in the first armature position, and wherein the valve poppet is permitted to selectively reciprocate between the poppet closed position and the poppet open position responsive to the armature being in the second armature position.

6. The solenoid valve of claim 5, including a core for selectively magnetically attracting the armature, the core being located longitudinally directly adjacent a core-activated surface of the armature, the armature being longitudinally interposed between the core and the valve poppet, the core being selectively energized to magnetically drive the armature between the first and second armature positions.

7. The solenoid valve of claim 5, including a poppet spring biasing the valve poppet toward the poppet closed position and sealing engagement with the valve seat when the armature is in the second armature position, the poppet spring being at least partially contained within a longitudinal poppet spring bore of the poppet and exerting an expansion force between the poppet and the armature.

8. The solenoid valve of claim 6, wherein a core sleeve is received at least partially in a housing also at least partially defining the input port and the output port, the core sleeve being configured to maintain the core in spaced relationship with the armature, the armature being at least partially enclosed within the core sleeve and guided thereby for selective longitudinal reciprocating motion with respect to the core responsive to energization of the core.

9. The solenoid valve of claim 8, wherein the core sleeve completely encloses the valve poppet, with a reduced-diameter sleeve shoulder, located on an opposite end of the valve poppet from the core, at least partially defining the valve seat by comprising at least a portion of an interior wall of the valve cavity.

10. The solenoid valve of claim 6, including a core spring biasing the armature toward the valve poppet, the core spring being at least partially contained within a longitudinal core spring bore of the armature and exerting an expansion force between the armature and the core.

11. The solenoid valve of claim 10, including a poppet spring biasing the valve poppet toward the poppet closed position and sealing engagement with the valve seat when the armature is in the second armature position, the poppet spring being at least partially contained within a longitudinal poppet spring bore of the poppet and exerting an expansion force between the poppet and the armature,
   wherein the core spring bore of the armature extends completely longitudinally through the armature and has a stepped inner bore surface and defines a vent path to place the core spring bore in fluid communication with the poppet spring bore,
   and wherein an outer surface of the armature includes at least one longitudinally extending flow slot placing a proximalmost end of the core spring bore in fluid communication with the output port and accordingly into fluid communication with the vent path, via the core spring bore.

12. An accumulator assembly, comprising:
   a medium pressure accumulator, including
      an MPA cavity including at least one brake-side passage adjacent a first end thereof and including at least one pump-side passage adjacent the first end thereof,
      an MPA piston for reciprocal longitudinal motion within the MPA cavity responsive to a predetermined amount of hydraulic fluid flow through at least one of the pump-side passage and the brake-side passage, and
      an MPA biasing spring for urging the MPA piston toward the first end of the MPA cavity;
   a nonpowered MPA fill valve interposed fluidically between the pump-side passage of the MPA cavity and a source of pressurized hydraulic fluid; and a powered MPA one-way valve interposed fluidically between the brake-side passage of the MPA cavity and the at least one corresponding wheel brake, the MPA one-way valve being a powered solenoid valve including a valve cavity placing an input port, configured to accept hydraulic fluid from the brake-side passage of the MPA cavity, and an output port, configured to supply hydraulic fluid to the at least one corresponding wheel brake, in selective fluid communication via a one-way valve fluid path, a valve seat located along the one-way valve fluid path and at least partially defined by an interior wall of the valve cavity, and a valve poppet configured for reciprocal motion between a poppet open position and a poppet closed position wherein, when the valve poppet is in the poppet closed position, a valve poppet shoulder selectively contacts the valve seat to substantially occlude fluid flow therepast along the one-way valve fluid path, the valve poppet having a valve poppet body, wherein the valve poppet shoulder includes a resilient annular seal contained within a sealing groove extending circumferentially around the valve poppet shoulder, the sealing groove being cooperatively defined at least partially longitudinally between a distal valve poppet flange of the valve poppet body and an annular poppet collar.

13. The accumulator assembly of claim 12, wherein the MPA fill valve includes an MPA fill valve cavity placing the pump-side passage of the MPA cavity and the source of pressurized hydraulic fluid in selective fluid communication via an MPA fill valve fluid path, an MPA fill valve seat located along the MPA fill valve fluid path and at least partially defined by an interior wall of the MPA fill valve cavity, an MPA fill valve poppet configured for reciprocal motion between a poppet rest position and a poppet closed position wherein an MPA fill valve poppet shoulder contacts the MPA fill valve seat to occlude fluid flow therepast along the MPA fill valve fluid path, and an MPA fill valve biasing spring urging the MPA fill valve poppet toward the poppet closed position, the MPA fill valve poppet selectively reciprocating responsive to at least one of biasing force from the MPA valve biasing spring and a fluid pressure differential between the source of pressurized hydraulic fluid and the MPA cavity.

14. The accumulator assembly of claim 12, wherein reciprocal motion of the valve poppet of the MPA one-way valve occurs at least partially responsive to a fluid pressure in the MPA cavity being greater than a predetermined wheel-side fluid pressure.

15. The accumulator assembly of claim 12, wherein the annular poppet collar of the MPA one-way valve is a separate piece from the valve poppet body and is maintained proximal to the distal valve poppet flange by a collar flange defined by a portion of the valve poppet body spaced apart from the valve poppet shoulder.

16. A brake system for actuating a plurality of wheel brakes comprising first and second pairs of wheel brakes, the system comprising:

a reservoir;

a motor-driven master cylinder operable during a normal non-failure braking mode by actuation of an electric motor of the master cylinder to generate brake actuating pressure at first and second MC outputs for hydraulically actuating the first and second pairs of wheel brakes, respectively;

a secondary brake module configured for selectively providing pressurized hydraulic fluid at first and second pump outputs for actuating the first and second pairs of wheel brakes in at least one of a normal non-failure braking mode and a backup braking mode, the secondary brake module including an electric pump motor configured to selectively pressurize the hydraulic fluid by transmitting rotary motion to at least two pump pistons, each pump piston providing pressurized hydraulic fluid to a corresponding one of the first and second pump outputs, each of the first and second pump outputs providing fluid to a corresponding one of the first and second pairs of wheel brakes;

first and second accumulator assemblies, with each accumulator assembly including a medium pressure accumulator, including an MPA cavity including at least one brake-side passage adjacent a first end thereof and including at least one pump-side passage adjacent the first end thereof, an MPA piston for reciprocal longitudinal motion within the MPA cavity responsive to a predetermined amount of hydraulic fluid flow through at least one of the pump-side passage and the brake-side passage, and an MPA biasing spring for urging the MPA piston toward the first end of the MPA cavity;

a nonpowered MPA fill valve interposed fluidically between the pump-side passage of the MPA cavity and a source of pressurized hydraulic fluid; and a powered MPA one-way valve interposed fluidically between the brake-side passage of the MPA cavity and the at least one corresponding wheel brake, the MPA one-way valve being a powered solenoid valve including a valve cavity placing an input port, configured to accept hydraulic fluid from the brake-side passage of the MPA cavity, and an output port, configured to supply hydraulic fluid to the at least one corresponding wheel brake, in selective fluid communication via a one-way valve fluid path, a valve seat located along the one-way valve fluid path and at least partially defined by an interior wall of the valve cavity, and a valve poppet configured for reciprocal motion between a poppet open position and a poppet closed position wherein, when the valve poppet is in the poppet closed position, a valve poppet shoulder selectively contacts the valve seat to substantially occlude fluid flow therepast along the one-way valve fluid path, the valve poppet having a valve poppet body, wherein the valve poppet shoulder includes a resilient annular seal contained within a sealing groove extending circumferentially around the valve poppet shoulder, the sealing groove being cooperatively defined at least partially longitudinally between a distal valve poppet flange of the valve poppet body and an annular poppet collar; and an electronic control unit for controlling at least one of the secondary brake module and the master cylinder responsive to at least one braking signal.

17. The brake system of claim 16, including a pump inlet attenuator interposed hydraulically between the reservoir and the pump pistons and in direct fluid connection with the reservoir via a single return line.

18. The brake system of claim 17, wherein the MPA fill valve includes an MPA fill valve cavity placing the pump-side passage of the MPA cavity and the source of pressurized hydraulic fluid in selective fluid communication via an MPA fill valve fluid path, an MPA fill valve seat located along the MPA fill valve fluid path and at least partially defined by an interior wall of the MPA fill valve cavity, an MPA fill valve poppet configured for reciprocal motion between a poppet rest position and a poppet closed position wherein an MPA fill valve poppet shoulder contacts the MPA fill valve seat to occlude fluid flow therepast along the MPA fill valve fluid path, and an MPA fill valve biasing spring urging the MPA fill valve poppet toward the poppet closed position, the MPA fill valve poppet selectively reciprocating responsive to at least one of biasing force from the MPA valve biasing spring and a fluid pressure differential between the source of pressurized hydraulic fluid and the MPA cavity, and wherein reciprocal motion of the MPA fill valve poppet at least partially occurs responsive to at least one of an application status of at least one associated wheel brake, relative pressures within the MPA cavity and at least one other component of the accumulator assembly, and the operation of at least associated one iso valve of an iso/valve control valve arrangement.

19. The brake system of claim 15, wherein a first brake pressure sensor is interposed hydraulically between a selected iso/dump control valve arrangement and a corresponding rear brake of a chosen one of the first and second pairs of wheel brakes, and a second brake pressure sensor is interposed hydraulically between an other iso/dump control valve arrangement and a corresponding rear brake of an other one of the first and second pairs of wheel brakes.

* * * * *